Patented Jan. 9, 1945

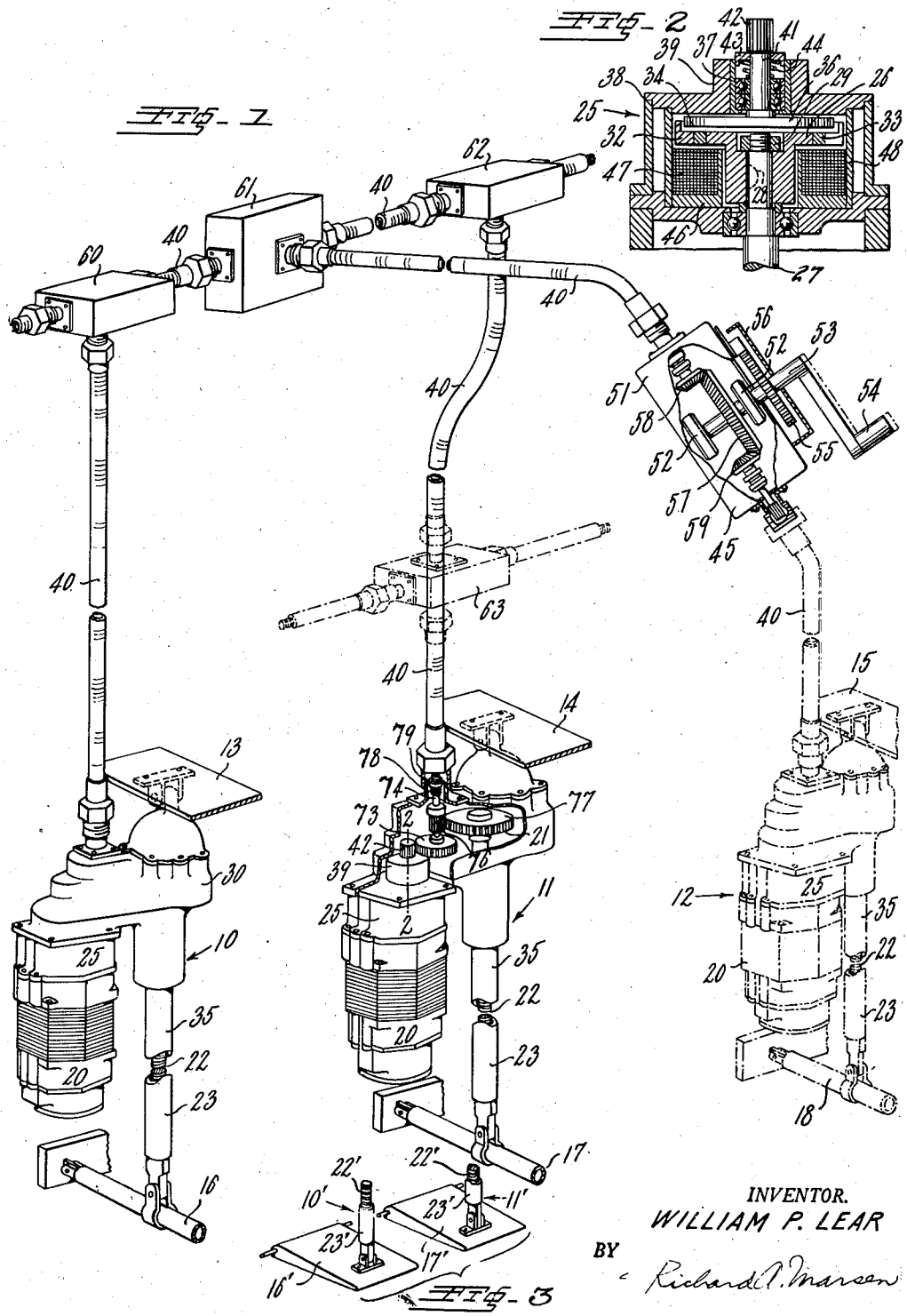

2,366,734

UNITED STATES PATENT OFFICE 2,366,734

MULTIPLE ACTUATOR SYSTEM

William P. Lear, Piqua, Ohio, assignor to Lear Avia, Inc., Piqua, Ohio, a corporation of Illinois Application June 9, 1943, Serial No. 490,136

14 Claims. (Cl. 244—102)

This invention relates to a multiple actuator system, and more particularly to a system embodying a plurality of mechanically interconnected power driven linear actuator units. This application is in part a continuation of my copending application Serial No. 483,515 filed April 17, 1943.

It is among the objects of this invention to provide a multiple actuator system comprising a plurality of interconnected linear actuator units, each driven by a separate power drive means; to provide such a system including means whereby any power drive means will be disconnected from its associated actuator upon deenergization or failure of such power drive means and its associated actuator be driven by the remaining power drive means; to provide manual drive means effective to operate all the actuator units of the system in the event of failure of all the power drive means therefor; to provide an improved multiple landing gear actuating mechanism for airplanes; and to provide a synchronized wing flap actuating mechanism for airplanes.

These and other objects of the invention will be apparent from the following description and accompanying drawing. In the drawing:

Fig. 1 is a perspective view of a multiple actuator system embodying the invention.

Fig. 2 is an enlarged cross-section of a magnetic clutch used in the invention, taken on the line 2—2 of Fig. 1.

Fig. 3 is a diagrammatic perspective view illustrating the invention as applied to actuate airplane wing flaps.

Referring to Fig. 1 of the drawing, linear actuator units 10, 11 and 12 are illustrated as connected at one end to relatively fixed supports 13, 14 and 15. At the opposite ends, units 10, 11 and 12 are connected to relatively movable members 16, 17 and 18. In the illustrated embodiment, fixed supports 13, 14 and 15 represent a relatively fixed portion of the fuselage of an airplane. Movable members 16, 17 and 18 represent landing gear struts pivoted to a fixed portion of the aircraft fuselage. Fig. 1 illustrates how the apparatus of the invention may be used for actuating a tricycle type retractable landing gear system. With a conventional two wheel landing gear, only two units, such as actuators 10 and 11, will be necessary.

The units 10, 11 and 12 may be of the type described and claimed in my said copending application Serial No. 483,515. Each linear actuator unit comprises a unitary assembly including a high speed electric motor 20, an electromagnetic clutch 25, a gear housing 30, and a jack screw 35. The clutch 25 is connected in electrical series or parallel circuit relation with the motor 20. When high speed motor 20 is energized, the clutch 25 is energized to connect the motor to reduction gearing 21 in gear housing 30. The jack screw comprises a screw 22 and a sleeve member 23 having internal threads engaging those of the screw. Screw 22 and sleeve 23 are relatively rotatable with respect to each other. One may be relatively fixed against rotation and the other may be connected to be rotated by reduction gearing 21. Thereby, motor 20, when energized, will extend and retract jack screw 35 through the medium of clutch 25 and gearing 21.

All of the actuators are interconnected by suitable driving mechanism such as flexible shafting indicated generally at 40. While the driving means has been illustrated as flexible shafting, such illustration is exemplary only. The units 10, 11 and 12 may be interconnected by gearing, rigid shafting, or any other type of driving connection. Due to such interconnection, in the event of failure of one or more of the motors 20, the actuators driven thereby will be driven by the remaining motors through the medium of the flexible shafting 40. In the event of failure of all of the motors 20, a manual drive means 45 is provided to operate actuators 10, 11 and 12. Electromagnetic clutches 25 are in series or parallel electric circuit arrangement with motors 20. Therefore, in the event of failure of a motor 20, its clutch 25 is deenergized and disconnects such motor from gearing 21, removing the idle motor load from the system and thereby reducing the amount of power required from the other motors to operate its associated actuator. Preferably, motors 20 are small, high speed motors operating the units 10, 11 and 12 through reduction gearing, so as to develop high torque for such operation.

Electromagnetic clutch 25 is illustrated more particularly in Fig. 2, and comprises a driving clutch member 26 secured on the motor drive shaft 27 by a key 28. A nut 29 threaded on the end of the motor drive shaft 27 holds member 26 fixed against longitudinal movement thereon. Member 26 includes a clutching surface 32 of magnetic material in which is set an annular member 33 of non-magnetic material.

Clutching surface 32 is adapted to have frictional and magnetic coaction with a clutching face 34 on a driven clutch member 36. Driven clutch member 36 is mounted in bearings 37 in an annular extension 39 of an end bell 38 of motor 20. Bearings 37 are fixed against longitudinal movement with respect to the motor drive shaft. Driven clutch member 36 includes a drive shaft 41 provided with a driving pinion 42 adjacent which is a collar 43. A coil spring 44 is disposed around shaft 41 between collar 43 and bearings 37 to normally urge driven clutch member 36 away from driving clutch member 26.

To provide magnetic flux for actuating clutch 25, a tubular member 46 is mounted in end bell 38 around the hub of driving member 26. A coil winding 47 is mounted on member 46 and an annular member 48 of magnetic material surrounds member 46 and coil 47. The hub of member 26 is likewise made of magnetic material. Coil 47 preferably is connected in series relation with motor 20, so that, upon energization of motor 20, coil 47 will create a magnetic flux circuit between driving member 26, driven member 36, annular member 48 and tubular member 46. Member 33 of non-magnetic material is provided to increase the magnetic attraction of the two clutch members for each other, as described in my Patent No. 2,267,114 issued December 23, 1941.

Clutch pinion 42 engages a gear 73 which is fixed on a shaft 74. On shaft 74 is another gear 76 meshing with a driving gear 77 for actuator 11. The end of shaft 74 is splined as at 78 for coaction with a coupling 79 for flexible shafting 40.

Manual drive means 45 includes a housing 51 in which are bearings 52 supporting a shaft 53 on the outer end of which is an operating handle 54. Shaft 53 conveniently may be made movable with respect to bearings 52 to provide for selective engagement and disengagement of gear 57 with gears 58 and 59.

The several sections of the flexible shafting 40 are interconnected through gear boxes 60, 61 and 62 containing suitable gearing for transmitting motion either in a straight line or at an angle from one section of shaft 40 to another section thereof. As many gear boxes may be provided as are necessary to properly interconnect the number of linear actuators which it is desired to operate in synchronism with each other. Such additional means are shown in dot-dash lines at 63.

As the several linear actuators are interconnected by shafting 40, they will operate in unison. Upon energization of the several motors 20, the associated clutches 25 are energized to connect each motor to drive its associated linear actuator through gearing 21. In the event motor 20 of unit 11, for instance, should fail, its associated clutch 25 becomes deenergized, disconnecting the motor armature from its actuator 11 and from shafting 40. Actuator 11 would then be operated by the other motors 20 through the medium of spline 78 and gears 76 and 77. If all of the motors 20 should fail, their respective clutches 25 would all be deenergized. The motors would accordingly be disconnected from flexible shafting system 40, while their associated linear actuators 10, 11 and 12 remain connected thereto. In such instance, the actuators are operated by manual drive means 45 through rotation of handle 54. A system is thus provided for continued operation in the event of failure of one or more, or of all, of the electric drives associated with the system. Reliability and continuity of operation are thus assured, so vital aboard an aircraft.

Flexible shafting 40 provides for a movement of the actuators with respect to relatively fixed supports 13, 14 and 15. While the connections of units 10, 11 and 12 to these supports and to movable members 16, 17 and 18 have been illustrated as simple hinge connections, it should be understood that these are representative only. Any suitable mechanical connection may be used for securing the actuator units to the fixed supports and the movable members. For instance, such connections may be those described and illustrated in my copending applications Serial No. 371,109 filed December 21, 1940, now Patent No. 2,319,463 issued May 18, 1943, and Serial No. 481,980 filed April 6, 1943.

Fig. 3 diagrammatically illustrates the application of the invention to the synchronized actuation of airplane wing flaps. In this figure, the same reference numerals, primed, have been used to designate corresponding or identical elements shown in Fig. 1. Each linear actuator unit 10' and 11' is connected to wing flaps 16' and 17', which are hingedly connected to a fixed portion of the airplane fuselage. Only a portion of each wing flap has been illustrated in Fig. 3, as the construction of such wing flaps is well known to those skilled in the art. Units 10' and 11' are connected to wing flaps 16' and 17' by a simple hinge connection. However, as in the embodiment of the invention illustrated in Fig. 1, the type of connections used may be those described and illustrated in my Patent No. 2,319,463 and my above identified copending application Serial No. 481,980. Units 10' and 11' are interconnected by drive mechanism in the same manner as units 10 and 11 of Fig. 1. Similarly, a manual drive means 45 is connected to the drive mechanism 40. Due to the mechanical interconnection of units 10' and 11', wing flaps 16' and 17' are operated in synchronism. Should either unit 10' or 11' fail, the other unit will actuate the wing flap associated with the inoperative unit in synchronism with the other actuated one; all the power being exerted by the operative unit. Also, should the motor power supply fail, or both units become inoperative, the manual drive means may be used to control the flap position.

While specific embodiments of the invention have been shown and described to illustrate how the principles of the invention may be put in practice, it will be obvious to those skilled in the art that the invention may be otherwise embodied without departing from the principles thereof.

What is claimed is:

1. A multiple actuator system comprising, in combination, a plurality of linear actuators each connected at one end to a relatively fixed support and at the other end to a relatively movable member; a plurality of power drive means each normally operative to drive one of said linear actuators; and driving mechanism interconnecting said linear actuators, whereby, upon failure of one or more of said power drive means the linear actuators normally driven thereby will be driven by the remaining power drive means through the medium of said driving mechanism.

2. A multiple actuator system comprising, in combination, a plurality of linear actuators each connected at one end to a relatively fixed support and at the other end to a relatively movable member; a plurality of power drive means, each normally operative to drive one of said linear actuators, each power drive means including clutch means operative, upon energization of such power drive means, to connect the same to its associated actuator and, upon deenergization of such power drive means, to disconnect the same from its associated actuator; and driving mechanism interconnecting said linear actuators, whereby, upon failure of one or more of said power drive means, the linear actuators normally driven thereby will be driven by the remaining power drive means through the medium of said driving mechanism.

3. A multiple actuator system comprising, in combination, a plurality of linear actuators each connected at one end to a relatively fixed support and at the other end to a relatively movable member; a plurality of power drive means each normally operative to drive one of said linear actuators; driving mechanism interconnecting said linear actuators, whereby, upon failure of one or more of said power drive means, the linear actuators normally driven thereby will be driven by the remaining power drive means through the medium of said driving mechanism; and manual drive means engageable with said driving mechanism for selectively driving the linear actuators through the medium of said driving mechanism.

4. A multiple actuator system comprising, in combination, a plurality of linear actuators each connected at one end to a relatively fixed support and at the other end to a relatively movable member; a plurality of power drive means each normally operative to drive one of said linear actuators, each power drive means including clutch means operative, upon energization of such power drive means, to connect the same to its associated actuator and, upon deenergization of such power drive means, to disconnect the same from its associated actuator; driving mechanism interconnecting said linear actuators, whereby, upon failure of one or more of said power drive means the linear actuators normally driven thereby will be driven by the remaining power drive means through the medium of said driving mechanism; and manual drive means engageable with said driving mechanism for selectively driving the linear actuators through the medium of said driving mechanism.

5. A multiple actuator system comprising, in combination, a plurality of linear actuators each connected at one end to a relatively fixed support and at the other end to a relatively movable member; a plurality of electric motors, each normally operative to drive one of said linear actuators, each electric motor including an electromagnetic clutch in electric circuit connection therewith and operative, upon energization of such electric motor, to connect the same to its associated actuator and, upon deenergization of such electric motor, to disconnect the same from its associated actuator; and driving mechanism interconnecting said linear actuators, whereby, upon failure of one or more of said electric motors, the linear actuators normally driven thereby will be driven by the remaining electric motors through the medium of said driving mechanism.

6. A multiple actuator system comprising, in combination, a plurality of linear actuators each connected at one end to a relatively fixed support and at the other end to a relatively movable member; a plurality of electric motors each normally operative to drive one of said linear actuators, each electric motor including an electromagnetic clutch in electric circuit connection therewith and operative, upon energization of such electric motor, to connect the same to its associated actuator and, upon deenergization of such electric motor, to disconnect the same from its associated actuator; driving mechanism interconnecting said linear actuators, whereby, upon failure of one or more of said electric motors, the linear actuators normally driven thereby will be driven by the remaining electric motors; and manual drive means engageable with said driving mechanism for selectively driving the linear actuators through the medium of said driving mechanism.

7. A multiple actuator system comprising, in combination, a plurality of jack screws each connected at one end to a relatively fixed support and at the other end to a relatively movable member; a plurality of electric motors each normally operative to extend and retract one of said jack screws, each electric motor including an electromagnetic clutch in electric circuit connection therewith and operative, upon energization of such electric motor, to connect the same to its associated jack screw and, upon deenergization of such electric motor, to disconnect the same from its associated jack screw; and driving mechanism interconnecting said jack screws, whereby upon failure of one or more of said electric motors, the jack screws normally extended and retracted thereby will be extended and retracted by the remaining electric motors through the medium of said driving mechanism.

8. A multiple actuator system comprising, in combination, a plurality of jack screws each connected at one end to a relatively fixed support and at the other end to a relatively movable member; a plurality of electric motors, each normally operative to extend and retract one of said jack screws, each electric motor including an electromagnetic clutch in electric circuit relation therewith and operative, upon energization of such electric motor, to connect the same to its associated jack screw and, upon deenergization of such electric motor, to disconnect the same from its associated jack screw; driving mechanism interconnecting said jack screws, whereby, upon failure of one or more of said electric motors the jack screw normally extended and retracted thereby will be extended and retracted by the remaining electric motors through the medium of said driving mechanism; and manual drive means engageable with said driving mechanism for selectively extending and retracting the jack screws through the medium of said driving mechanism.

9. A multiple actuator system comprising, in combination, a plurality of linear actuators each flexibly connected at one end to a relatively fixed support and at the other end to a relatively movable member; a plurality of electric motors each normally operative to drive one of said linear actuators, each electric motor including an electromagnetic clutch in electric circuit relation therewith and operative, upon energization of such electric motor to connect the same to its associated actuator and, upon deenergization of such electric motor to disconnect the same from its associated actuator; and flexible shafting interconnecting said linear actuators for operation in synchronism, whereby, upon failure of one or more of said motors, the linear actuators normally driven thereby will be driven by the remaining motors through the medium of said flexible shafting and manual drive means.

10. A multiple actuator system comprising, in combination, a plurality of linear actuators each flexibly connected at one end to a relatively fixed support and at the other end to a relatively movable member; a plurality of electric motors, each normally operative to drive one of said linear actuators, each electric motor including an electromagnetic clutch in electric circuit relation therewith and operative, upon energization of such electric motor, to connect the same to its associated actuator and, upon deenergization of such electric motor to disconnect the same from its associated actuator; flexible shafting interconnecting said linear actuators for operation in synchronism, whereby upon failure of one or more of said electric motors the linear actuators normally driven thereby will be driven by the remaining electric motors through the medium of said flexible shafting and manual drive means engageable with said flexible shafting for selectively driving the linear actuators through the medium of said flexible shafting.

11. A wing flap actuating system for aircraft comprising, in combination, a pair of jack screws each connected at one end to a fixed portion of the aircraft fuselage and at the other end to a movable wing flap; a pair of electric motors each normally operative to drive one of said screws to move its associated wing flap with respect to the fixed portion of the fuselage; a pair of electromagnetic clutches each connected in electric circuit relation with one of said motors and each operative, upon energization of such motor, to connect the same to its associated jack screw, and, upon deenergization of such motor, to disconnect the same from its associated jack screw; and mechanism interconnecting said jack screws for operation in synchronism, whereby, upon failure of one of said motors, its associated jack screw will be driven by the other motor to operate the wing flap connected thereto.

12. A wing flap actuating system for aircraft comprising, in combination, a pair of jack screws each connected at one end to a fixed portion of the aircraft fuselage and at the other end to a movable wing flap; a pair of electric motors each normally operative to drive one of said screws to move its associated wing flap with respect to the fixed portion of the fuselage; a pair of electromagnetic clutches each connected in electric circuit relation with one of said motors and each operative, upon energization of such motor, to connect the same to its associate jack screw, and, upon deenergization of such motor, to disconnect the same from its associated jack screw; mechanism interconnecting said jack screws for operation in synchronism, whereby, upon failure of one of said motors, its associated jack screw will be driven by the other motor to operate the wing flap connected thereto; and manual drive means engageable with said mechanism for selectively operating the wing flaps through the medium of said mechanism and said jack screws.

13. An airplane landing gear actuating mechanism comprising, in combination, a plurality of jack screws each connected at one end to a fixed portion of the aircraft fuselage and at the other end to a movable portion of a landing gear; a plurality of electric motors each normally operative to extend and retract one of said jack screws to operate the associated landing gear; a plurality of electromagnetic clutches, each in electric circuit relation with one of said motors and each operative, upon energization of such motor, to connect the same to its associated jack screw and, upon deenergization of such motor, to disconnect the same from its associated jack screw; and mechanism interconnecting said jack screws whereby, upon failure of one of said electric motors, its associated jack screw will be extended and retracted by the other electric motors to operate the landing gear connected thereto.

14. An airplane landing gear actuating mechanism comprising, in combination, a plurality of jack screws each connected at one end to a fixed portion of the aircraft fuselage and at the other end to a movable portion of a landing gear; a plurality of electric motors each normally operative to extend and retract one of said jack screws to operate the associated landing gear; a plurality of electromagnetic clutches, each in electric circuit relation with one of said motors and each operative, upon energization of such motor, to connect the same to its associated jack screw and, upon deenergization of such motor, to disconnect the same from its associate jack screw; mechanism interconnecting said jack screws whereby, upon failure of one of said electric motors, its associated jack screw will be extended and retracted by the other electric motors to operate the landing gear connected thereto; and manual drive means engageable with said mechanism for selectively operating the landing gears through the medium of said mechanism and said jack screws.

WILLIAM P. LEAR.